C. J. TOMLINSON.
NUT LOCK.
APPLICATION FILED AUG. 18, 1908.
948,357. Patented Feb. 8, 1910.
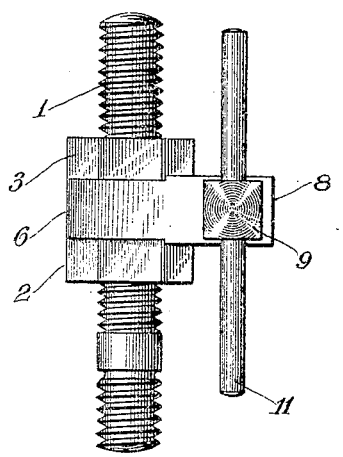
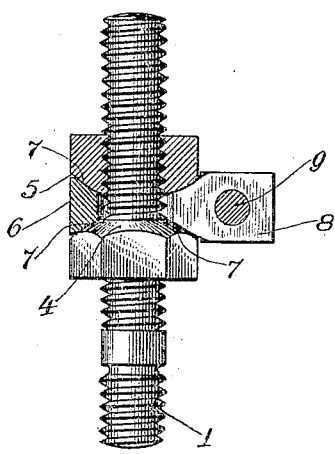
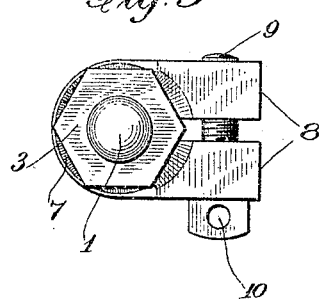
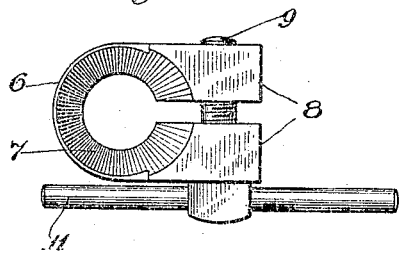
Witnesses:
M. A. Packard
M. D. Haug
Inventor
Charles J. Tomlinson
By his Attorneys
Prindle & Wright

UNITED STATES PATENT OFFICE.

CHARLES J. TOMLINSON, OF TROY, PENNSYLVANIA.

NUT-LOCK.

948,357.  Specification of Letters Patent.  Patented Feb. 8, 1910.

Application filed August 18, 1908. Serial No. 449,153.

*To all whom it may concern:*

Be it known that I, CHARLES J. TOMLINSON, of Troy, in the county of Bradford and in the State of Pennsylvania, have invented a certain new and useful Improvement in Nut-Locks, and do hereby declare that the following is a full, clear, and exact description thereof.

My invention relates to a nut lock, and especially to a nut lock wherein nuts of the ordinary character may be readily locked in place by means of a single attachment to a bolt of the ordinary type.

The main feature of my invention consists in applying a very powerful wedging action to the face of a nut of the ordinary type having a rounded surface. A somewhat more efficient wedging action results, however, when the heads of the nuts used are constructed with convex outer surfaces, the curve extending throughout the entire face of the nut, instead of, as in the case of the ordinary type of nut, having an outer surface made convex for only a portion of its extent. I accomplish the above result by the application of a split ring having double opposed concave surfaces adapted to fit upon and contact with the convex surfaces of two nuts located upon a bolt, of the ordinary type. I do not, however, consider that my invention is necessarily limited to the use of a split ring to accomplish the wedging action, as many other constructions, embodying the broad features of said wedging action, might be constructed to accomplish the same purpose.

I have shown the preferred form of my invention in the accompanying drawings, in which—

Figure 1 is a vertical elevation of a bolt equipped with the nut lock attachment. Fig. 2 is a similar view, partly in section. Fig. 3 is a plan view of the same, and Fig. 4 is a plan view of the split ring and bolt attachment.

In the accompanying drawings, 1 is a screw-threaded bolt of the ordinary type, having situated thereon nuts 2 and 3, provided with opposed convex surfaces 4 and 5. Situated between these convex surfaces is a split ring 6, having on either face a concave surface 7, and provided at its two free ends 8 with a transversely extending bolt 9. This bolt may be provided in any suitable manner with a means for tightening it. In the present instance I have shown it with a squared head and also with a transverse aperture 10, extending through the head for the passage of a rod 11, to be used as a lever.

In the operation of my device, I first screw the nut 2 onto the bolt and tighten the same to the desired extent against the face of the parts being bolted together. Then, after placing the split ring upon the bolt in the front of the nut 2 and contacting with the outer convex surfaces of the nut, I screw the second nut upon the bolt so as to bring its convex surface into coöperation with the concave surface of the split ring, screwing this nut into place as tightly as possible. Finally, I tighten the bolt 9 in any suitable manner, screwing the same as tightly as possible. It will be seen that this tightening of the bolt 9 causes the concave surfaces of the split ring to contract upon the convex surfaces of the two nuts, thus producing a powerful wedging action. It will also be seen that by this arrangement the leverage obtained to produce the wedging and tightening movement is far greater than could be obtained by the mere tightening of either one of the nuts alone. A much more powerful wedging action and tightening effect can therefore be obtained by this construction than in any construction where a nut alone is used to produce the tightening effect. At the same time, it should be realized that by the mere use of the double opposed concave surfaces in conjunction with the coöperating convex surfaces of the two nuts, a very powerful wedging action in itself is obtained, as not only is the one nut tightened by its contact with the concave surface in question, but any movement of the one nut also results in a corresponding tightening against the convex surface of the other nut.

While I have described my invention above in detail, and especially as applied to one particular type of locked nut, I do not wish it to be understood that I am necessarily limited to the details herein described, as I consider that my invention is capable of embodiment in many different types of devices, without departing from the spirit thereof.

I claim:

1. In a nut lock, the combination of a bolt, a nut thereon having a circularly beveled end, an abutment and an expansible split ring adapted to press against said abutment, and having an inclined surface adapted to coöperate with the circularly beveled end of the nut.

2. In a nut lock the combination of a bolt, a plurality of nuts thereon and a split ring having concave faces for securing said nuts in place.

3. In a nut lock the combination of a bolt, a plurality of nuts thereon and a split ring having inclined faces for securing said nuts in place and coöperating with similar faces upon the nuts.

4. In a nut lock the combination of a bolt, a plurality of nuts thereon and a split ring having concave faces for securing said nuts in place and coöperating with complementary convex faces upon the nuts.

5. In a nut lock the combination of a bolt, a plurality of nuts thereon, having opposed wedging faces and an expansible wedging ring coöperating with said wedging faces.

6. In a nut lock the combination of a bolt, a plurality of nuts thereon, having opposed wedging faces a wedging ring coöperating with said wedging faces and means for tightening said wedging ring to lock the nuts.

In testimony that I claim the foregoing I have hereunto set my hand.

CHARLES J. TOMLINSON.

Witnesses:
JNO. A. PARSONS,
WILBER H. PARSONS.